(12) United States Patent
Roy et al.

(10) Patent No.: US 11,755,444 B2
(45) Date of Patent: Sep. 12, 2023

(54) MONITORING HIGHER-LEVEL SERVICE HEALTH IN A SCALABLE WAY

(71) Applicant: Dell Products L.P., Round Rock, TX (US)

(72) Inventors: Amitava Roy, Lexington, MA (US); Gerald Choi, Quincy, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/509,194

(22) Filed: Oct. 25, 2021

(65) Prior Publication Data

US 2023/0126757 A1  Apr. 27, 2023

(51) Int. Cl.
  G06F 11/00  (2006.01)
  G06F 11/30  (2006.01)
  G06F 11/07  (2006.01)
  G06F 11/32  (2006.01)

(52) U.S. Cl.
  CPC ...... *G06F 11/3055* (2013.01); *G06F 11/0787* (2013.01); *G06F 11/327* (2013.01)

(58) Field of Classification Search
  None
  See application file for complete search history.

(56) References Cited

U.S. PATENT DOCUMENTS

| 7,805,511 B1* | 9/2010 | Panicker | H04L 43/0817 370/242 |
| 11,416,369 B1* | 8/2022 | Trapani | G06F 11/3419 |
| 2013/0013953 A1* | 1/2013 | Eck | G06F 11/0712 718/1 |
| 2020/0250062 A1* | 8/2020 | Arora | G06F 11/3006 |

OTHER PUBLICATIONS

Google Scholar/Patents search—text refined (Year: 2022).*
Google Scholar/Patents search—text refined (Year: 2023).*

* cited by examiner

*Primary Examiner* — Christopher S McCarthy
(74) *Attorney, Agent, or Firm* — Krishnendu Gupta; Lesley Leonessa

(57) ABSTRACT

Methods, system, and non-transitory processor-readable storage medium for higher-level service health are provided herein. An example method includes monitoring, by a monitoring tool, status metrics associated with at least one of a plurality of physical devices and a plurality of component services, where alerts generated from the monitoring tool are stored in a database associated with the monitoring tool. At least one of the component services executes on the at least one of the plurality of physical devices. A microservice identifies at least one logical service. The logical service is comprised of at least one of the plurality of physical devices, and/or at least one of the plurality of component services. The microservice determines a health metric associated with at least one logical service based on the generated alerts. The microservice transmits the health metric associated with the logical service from the microservice to the monitoring tool.

19 Claims, 5 Drawing Sheets

MONITORING HIGHER-LEVEL SERVICE HEALTH IN A SCALABLE WAY

FIELD

The field relates generally to information processing systems, and more particularly to monitoring higher-level service health in such systems.

BACKGROUND

In an information processing system, a higher-level service can be an agglomeration of a set of component services. The health of a higher-level service is a function of the health of the component services and the health of relevant hardware(s), on which the component services are executed. Standard monitoring tools can be configured to monitor both the component service(s) (for example, a microservice running on a VM) and relevant hardware(s) and additionally generate rule-based alerts when the component services and/or hardware do not function properly.

SUMMARY

Illustrative embodiments provide techniques for implementing a higher-level service health system in a storage system. For example, illustrative embodiments monitor, by a monitoring tool, status metrics associated with at least one of a plurality of physical devices and a plurality of component services. Alerts generated from the monitoring tool are stored in a database associated with the monitoring tool. At least one of the component services executes on at least one of the plurality of physical devices. Illustrative embodiments identify, by a microservice, at least one logical service, where at least one logical service is comprised of at least one of at least one of the plurality of physical devices, and/or at least one of the plurality of component services. Illustrative embodiments determine, by the microservice, a health metric associated with at least one logical service based on the generated alerts. Illustrative embodiments transmit the health metric associated with at least one logical service from the microservice to the monitoring tool. Other types of processing devices can be used in other embodiments.

These and other illustrative embodiments include, without limitation, apparatus, systems, methods and processor-readable storage media.

DETAILED DESCRIPTION

Figure 1:
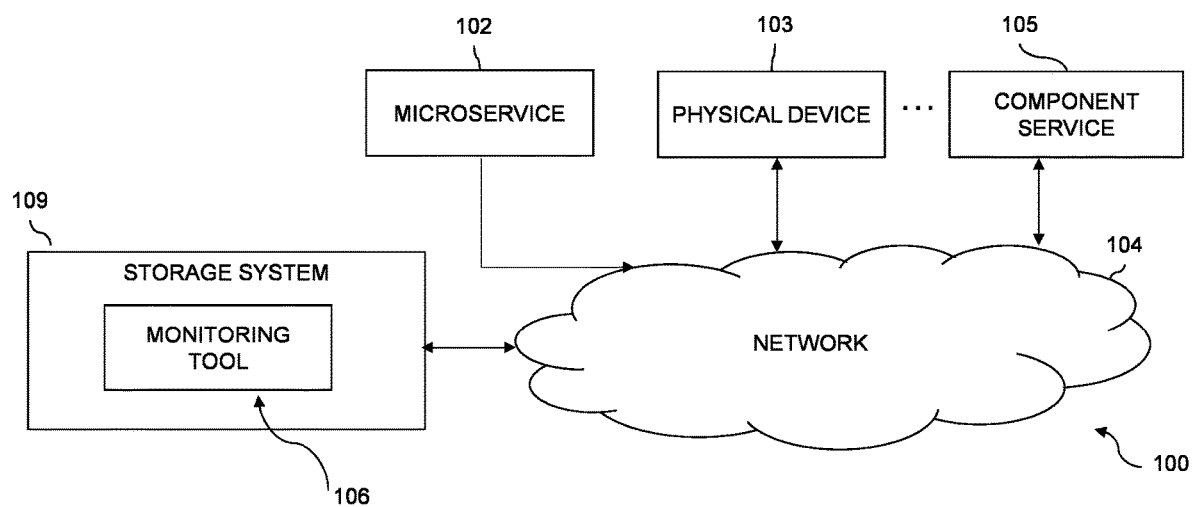
FIG. 1 shows an information processing system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a higher-level service health system, which technique may be used to provide, among other things, monitoring, by a monitoring tool, status metrics associated with at least one of a plurality of physical devices and/or a plurality of component services. Alerts generated from the monitoring tool are stored in a database associated with the monitoring tool. At least one of the component services executes on at least one of the plurality of physical devices. A microservice identifies at least one logical service, where at least one logical service is comprised of at least one of at least one of the plurality of physical devices, and at least one of the plurality of component services. The microservice determines a health metric associated with at least one logical service based on the generated alerts. The microservice transmits the health metric associated with at least one logical service to the monitoring tool. Other types of processing devices can be used in other embodiments.

Conventional approaches to monitoring higher-level services can be problematic. Conventional technologies provide a monitoring tool that does not monitor the health status of logical or abstract services. Conventional technologies that monitor the health status of logical or abstract services require maintaining a separate database (from the monitoring tool) for collecting data associated with the logical service, and periodically importing a subset of the data from the monitoring tool database to the separate database for collecting data associated with the logical service. Then, the database associated with the logical service must be queried for data, and business logic must be written to analyze the data to determine the health of the logical service. Next application logic must be written to generate alerts from the analyzed data. Conventional technologies require collection and analysis of all the collected data instead of only analyzing generated alerts. Conventional technologies place additional demand on storage, CPU, and memory.

By contrast, in at least some implementations in accordance with the current technique as described herein, in a higher-level service health system, a monitoring tool monitors status metrics associated with at least one of a plurality of physical devices and a plurality of component services. Alerts generated from the monitoring tool are stored in a database associated with the monitoring tool. At least one of the component services executes on at least one of the plurality of physical devices. A microservice identifies at least one logical service, where at least one logical service is comprised of at least one of at least one of the plurality of physical devices, and at least one of the plurality of component services. The microservice determines a health metric associated with at least one logical service based on the generated alerts. The microservice transmits the health metric associated with at least one logical service to the monitoring tool.

Thus, a goal of the current technique is to provide a method and a system for providing a higher-level service health system. Another goal is to provide a higher-level service health system that monitors the health status of logical or abstract services. Yet another goal is to provide a higher-level service health system that does not require adding an additional database, providing business logic to analyze the data, and application logic to trigger alerts associated with the logical services. Yet another goal is to provide a higher-level service health system that is efficiently triggered only when alerts occur. Yet another goal is to determine the higher-level service health in an efficient and scalable way using fewer resources and code complexity.

In at least some implementations in accordance with the current technique described herein, the use of a higher-level service health system can provide one or more of the following advantages: provide a higher-level service health system that monitors the health status of logical or abstract services, provide a scalable, efficient higher-level service health system that is far less demanding on storage, CPU and memory, determine the higher-level service health in an efficient and scalable way using fewer resources and code complexity, and provide an higher-level service health system that is efficiently only triggered when alerts occur.

In contrast to conventional technologies, in at least some implementations in accordance with the current technique as described herein, in a higher-level service health system, a monitoring tool monitors status metrics associated with at least one of a plurality of physical devices and a plurality of component services. Alerts generated from the monitoring tool are stored in a database associated with the monitoring tool. At least one of the component services executes on at least one of the plurality of physical devices. A microservice identifies at least one logical service, where at least one logical service is comprised of at least one of at least one of the plurality of physical devices, and/or at least one of the plurality of component services. The microservice determines a health metric associated with at least one logical service based on the generated alerts. The microservice transmits the health metric associated with at least one logical service to the monitoring tool.

In an example embodiment of the current technique, the monitoring tool generates at least one alert when at least one of a respective physical device and/or component service malfunctions.

In an example embodiment of the current technique, the microservice maintains a mapping of at least one logical service and components that comprise at least one logical service, wherein the components comprise at least one of i) a second logical service, ii) at least one of the plurality of physical devices, and iii) at least one of the plurality of component services.

In an example embodiment of the current technique, the microservice determines the health metric associated with at least one logical service based on the mapping and alerts associated with the components.

In an example embodiment of the current technique, the microservice determines a gradation of the health metric associated with at least one logical service based on alerts associated with the components.

In an example embodiment of the current technique, the microservice determines the health metric associated with at least one logical service based on a composition of alerts associated with the components.

In an example embodiment of the current technique, the microservice determines the health metric associated with at least one logical service based on at least one alert provided by the monitoring tool.

In an example embodiment of the current technique, the microservice collects the generated alerts from the monitoring tool that are associated with at least one of i) at least one of the plurality of physical devices, and ii) at least one of the plurality of component services that comprise at least one logical service.

In an example embodiment of the current technique, the microservice determines a health metric associated with at least one logical service by applying a rule to the generated alerts.

In an example embodiment of the current technique, at least one logical service is comprised of at least one second logical service.

In an example embodiment of the current technique, the microservice determines the health metric associated with at least one logical service based on at least one of at least one alert and a health metric associated with at least one second logical service, obtained by the microservice from the monitoring tool.

In an example embodiment of the current technique, the microservice transmits an alert associated with at least one logical service to the monitoring tool.

In an example embodiment of the current technique, the microservice generates a rule that maps the health metric associated with at least one logical service to an alert associated with at least one logical service.

In an example embodiment of the current technique, the microservice obtains a health metric associated with at least one logical service from the monitoring tool, and determines an alert has been generated on at least one logical service.

In an example embodiment of the current technique, the microservice obtains from the monitoring tool, an alert associated with at least one logical service.

In an example embodiment of the current technique, the microservice determines a health metric associated with a third logical service based on the alert associated with at least one logical service, where the third logical service comprises at least one logical service.

FIG. 1 shows a computer network (also referred to herein as an information processing system) 100 configured in accordance with an illustrative embodiment. The computer network 100 comprises a storage system 109 comprising a monitoring tool 106, a microservice 102, at least one physical device 103, and at least one component service 105. The storage system 109 microservice 102, physical device 103, and component service 105 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. As noted above, also coupled to network 104 is a storage system 109. Such storage systems can comprise any of a variety of different types of storage including network-attached storage (NAS), storage area networks (SANs), direct-attached storage (DAS) and distributed DAS, as well as combinations of these and other storage types, including software-defined storage.

The microservice 102, physical device 103, and component service 105 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The microservice 102, physical device 103, and component service 105 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Figure 2:
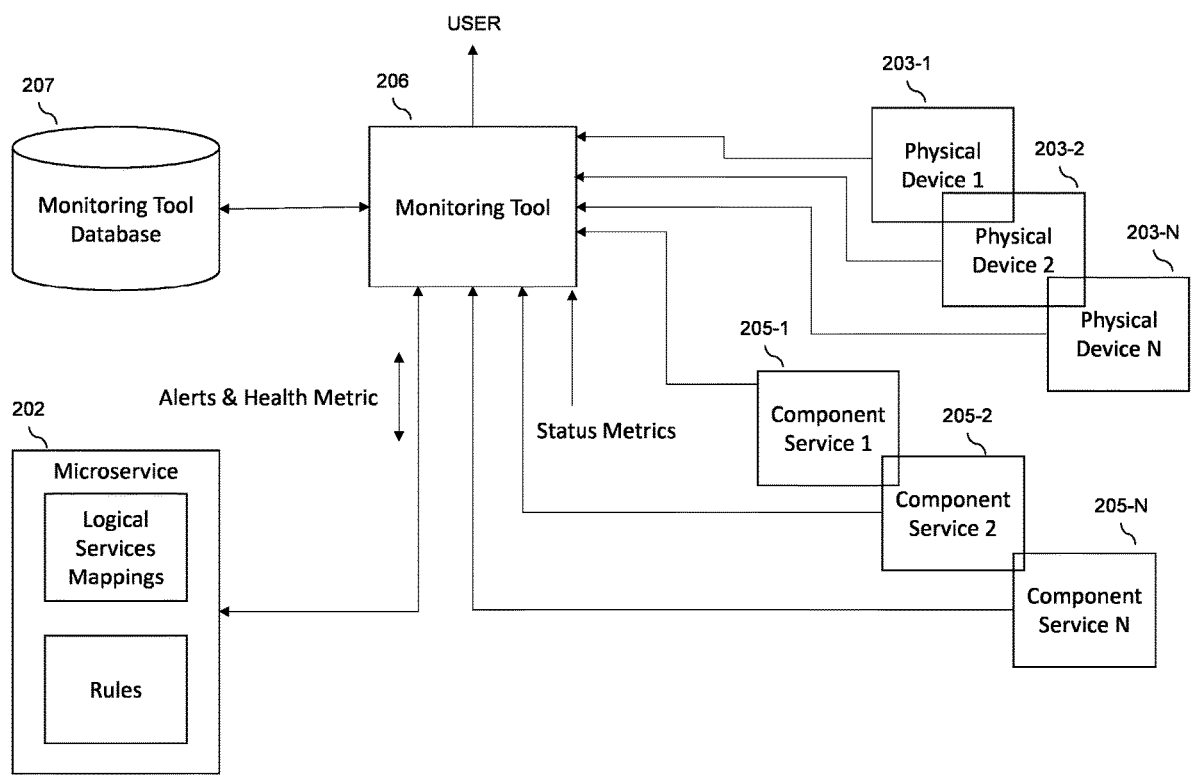
FIG. 2 shows an example of a higher-level service health system in an illustrative embodiment.

Also associated with the storage system 109 are one or more input-output devices, which illustratively comprise keyboards, displays or other types of input-output devices in any combination. Such input-output devices can be used, for example, to support one or more user interfaces to the storage system 109, as well as to support communication between storage system 109 and other related systems and devices not explicitly shown. For example, a user may receive alerts via the monitoring tool 106 as illustrated in FIG. 2. One or more input-output devices may also be associated with any of microservice 102, physical device 103, and component service 105.

Additionally, the storage system 109 in the FIG. 1 embodiment is assumed to be implemented using at least one processing device. Each such processing device generally comprises at least one processor and an associated memory, and implements one or more functional modules for controlling certain features of the storage system 109.

More particularly, the storage system 109 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements. The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the storage system 109 to communicate over the network 104 with the microservice 102, physical device 103, and component service 105, and illustratively comprises one or more conventional transceivers.

A higher-level service health system may be implemented at least in part in the form of software that is stored in memory and executed by a processor, and may reside in any of storage system 109 and/or microservice 102, physical device 103, and component service 105. The higher-level service health system may be a standalone plugin that may be included within a processing device. That processing device may be any of storage system 109, microservice 102, physical device 103, and component service 105, or any other processing device. The higher-level service health system may reside on processing devices separate from storage system 109 and/or microservice 102, physical device 103, and component service 105. In this example scenario, any of storage system 109 and microservice 102, physical device 103, and component service 105 may send and receive messages to the separate processing devices to access the methods of the higher-level service health system.

It is to be understood that the particular set of elements shown in FIG. 1 for storage system 109 involving microservice 102, physical device 103, and component service 105 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the storage system 109 can be on and/or part of the same processing platform.

An exemplary process of an example higher-level service health system using storage system 109 and microservice 102, physical device 103, and component service 105 in computer network 100 will be described in more detail with reference to, for example, FIG. 2, and the flow diagram of FIG. 3.

Referring now to FIG. 2, this figure shows an example of a higher-level service health system in an illustrative embodiment. The monitoring tool 206 periodically collects status metrics from physical devices 203-N and component services 205-N and stores the associated metrics and generated alerts in the monitoring tool database 207. In an example embodiment, the monitoring tool 206 may receive alerts from the physical devices 203-N and/or component services 205-N, for example, when either of the physical devices 203-N and/or component services 205-N malfunctions.

The higher-level service health system comprises a microservice 202 that maps the higher-level service, or logical service, to its associated physical devices 203-N and component services 205-N. The higher-level service is a logical (or abstract) service without any monitorable metrics of its own and therefore, cannot be directly monitored by the monitoring tool 206. In an example embodiment, the microservice 202 may comprise rules associated with any of the physical devices 203-N, component services 205-N, and logical services. Alerts associated with logical services may be generated from the rules in the microservice 202, and/or the status metrics, and health metrics received from the monitoring tool 206.

In an example embodiment, there may be a hierarchy of these logical services where a logical service is comprised of a sub logical services (and any of those sub logical services may be comprised of sub-sub logical services). The logical services mappings in the microservice 202 may also include this hierarchy among logical services. Thus, in an example embodiment, alerts associated with logical services may be generated by the microservice 202 from the rules as those alerts apply to the logical services and sub logical services within the hierarchy of logical services, along with any alerts associated with physical device 203-N and/or component service 205-N that are associated with any of the logical services, sub logical services, etc.

The microservice 202 collects alerts, and status metrics periodically from the monitoring tool 206, and determines the health of the logical services based on the alerts (i.e., alerts associated with any of the physical device 203-N and component service 205-N) and the mapping in the microservice 202. From this information, in an example embodiment, the microservice 202 may generate an alert associated with a logical service and send the alerts and health status (or health metrics) back to the monitoring tool 206. In an example embodiment, the monitoring tool 206 sends alerts to the monitoring tool database 207. In another example embodiment, the monitoring tool 206 may obtain alerts associated with a logical service from the monitoring tool database 207, and the microservice 202 may obtain those alerts associated with a logical service from the monitoring tool 206.

Once the microservice 202 has determined the health status and/or generated an alert associated with the logical service, and transmitted that information back to the monitoring tool 206, the monitoring tool 206 can now provide this information back to the microservice 202. For example, the microservice 202 can now collect alerts, health metrics, and status metrics periodically from the monitoring tool 206, and determine the health of the logical services based on the alerts (i.e., alerts associated with any of the physical device 203-N, component service 205-N, logical services, sub logical services, etc.) and the mapping in the microservice 202. From this information, in an example embodiment, the microservice 202 may generate an alert associated with a logical service and send the alerts and health status (or health metrics) back to the monitoring tool 206. In other words, the microservice 202 may determine, based on alerts provided by the monitoring tool 206, the health status of a first logical service, generate an alert associated with that first logical service, and transmit that alert to the monitoring tool 206. The microservice 202 can obtain alerts associated with physical device 203-N, component service 205-N, and the first logical service from the monitoring tool 206. Based on the mappings and rules in the microservice 202 associated with a second logical service, the microservice 202 may determine the health status of the second logical service (which, in this example scenario, is comprised of at least the first logical service), generate an alert associated with the second logical service, and transmit that alert back to the monitoring tool 206. This can be repeated recursively, and thus, the microservice 202 provides a health status for logical services, even when logical services are comprised of a hierarchy of other logical services.

In an example embodiment, the monitoring tool 206 may report out the health status and/or alerts associated with any of the logical services, physical device 203-N, and/or component service 205-N. For example, a user, such as a manager or a director in an organization may be interested in receiving an e-mail when a higher-level service (i.e., a logical service) fails, triggered by the failure of one of its component services 205-N, whereas a support person may be interested in the statuses of the higher-level service, component services 205-N, and physical devices 203-N.

Therefore, even when a logical service is comprised of sub logical services, the microservice 202 may also collect alerts from the monitoring tool 206 that are associated with the logical service, the sub logical services, and even sub-sub logical services, as well as collecting alerts and status metrics associated with physical device 203-N and component service 205-N. Thus, even though the monitoring tool 206 can not provide information about the health status (or health metric) of a logical service, the microservice 202, through the mapping and rules associated with the microservice 202, leverages the monitoring tool 206 to provide alerts associated with logical services and any associated sub logical services within hierarchies of logical services. The microservice 202 collects alerts, health metrics, and status metrics periodically from the monitoring tool 206, and determines the health of the logical services based on the alerts (i.e., alerts associated with any of the physical device 203-N, component service 205-N, logical services, sub logical services, etc.) and the mapping in the microservice 202.

Figure 3:
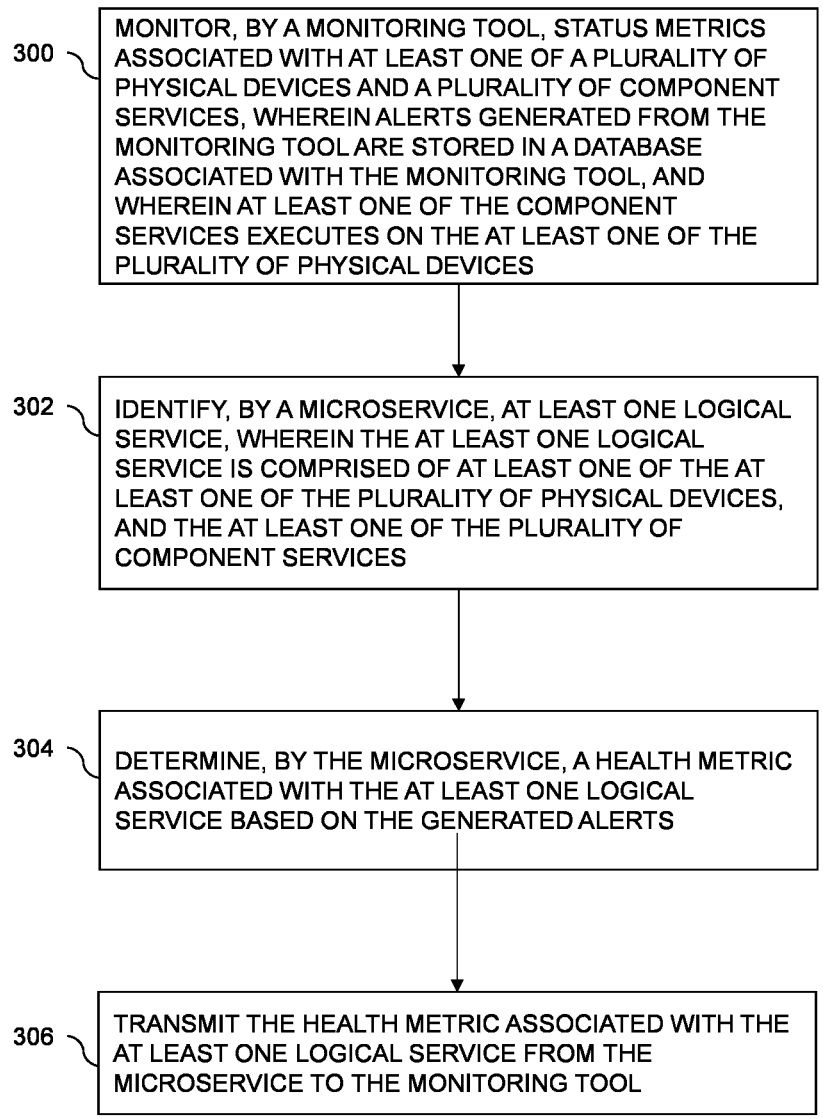
FIG. 3 shows a flow diagram of a process for a higher-level service health system in an illustrative embodiment.

FIG. 3 is a flow diagram of a process for a higher-level service health system in an illustrative embodiment. It is to be understood that this particular process is only an example, and additional or alternative processes can be carried out in other embodiments.

At 300, the monitoring tool 206 monitors status metrics with at least one of a plurality of physical devices 203-N and a plurality of component services 205-N. In an example embodiment, the monitoring tool 206 gathers status metrics from physical device 203-N and component service 205-N, and stores that data in the monitoring tool database 207. In an example embodiment, the monitoring tool 206 generates alerts when a physical device 203-N or component service 205-N malfunctions.

Alerts generated from the monitoring tool 206 are also stored in the monitoring tool database 207 associated with the monitoring tool 206. In an example embodiment, at least one of the component services 205-N executes on at least one of the plurality of physical devices 203-N.

At 302, the microservice 202 identifies at least one logical service. In an example embodiment, the logical service is comprised of at least one of a physical device 203-N and component service 205-N. In an example embodiment, the logical service is comprised of at least one second logical service. The logical service may be comprised of any combination of physical device 203-N, component service 205-N, and other logical services. In an example embodiment, there may be a hierarchy of these logical services where a logical service is comprised of a sub logical services (and any of those sub logical services may be comprised of sub-sub logical services).

At 304, the microservice 202 determines a health metric associated with at least one logical service based on the generated alerts. In an example embodiment, the microservice 202 collects generated alerts from the monitoring tool that are associated with at least one of the physical devices 203-N, component services 205-N, and logical sub services that comprise the logical service. In an example embodiment, if there are no alerts for any of the physical device 203-N, component service 205-N, and/or sub logical services that comprise the logical service, then the microservice 202 may determine that the logical service has no issues.

In an example embodiment, the microservice 202 determines the health metric associated with the logical service based on at least one alert provided by the monitoring tool.

In other words, if there are alerts for any of the physical device 203-N, component service 205-N, and/or sub logical services that comprise the logical service, then the microservice 202 may determine that there is an issue with the health status of the logical service.

At 306 the microservice 202 transmits the health metric and/or alert associated with the logical service from the microservice 202 to the monitoring tool 206. In an example embodiment, the monitoring tool 206 then transmits the health metric from the monitoring tool 206 to the monitoring tool database 207.

In an example embodiment, a rule is generated in the microservice 202 that maps the health metric associated with the logical service to an alert associated with the logical service. For example, there may be health metrics that generate an alert associated with the logical service and health metrics that don't. When a health metric that should generate an alert occurs, the rules map that health metric to an alert associated with the logical service. The microservice 202 then transmits the alert to the monitoring tool 206. In an example embodiment, the monitoring tool 206 may then transmit that alert to the monitoring tool database 207. If the logical service is a sub logical service of a second logical service, the microservice 202 may then obtain the alert associated with the logical service from the monitoring tool 206 (and the monitoring tool 206 may have obtained that alert from the monitoring tool database 207). In this example scenario, another rule may trigger an alert associated with the second logical and transmit that alert (associated with the second logical service) from the microservice 202 to the monitoring tool 206.

In an example embodiment, each alert will have a label that uniquely identifies the logical service to which that alert applies. In an example embodiment, each alert rule will have a custom label to uniquely identify the respective logical service, physical device 203-N or component service 205-N. In an example embodiment, each alert rule will have a custom label to uniquely identify the respective malfunction that caused the alert.

In an example embodiment, the microservice 202 obtains a health metric associated with at least one logical service from the monitoring tool 206. Based on the health metric, the microservice 202 determines that an alert has been generated on the logical service. For example, the microservice 202 may apply a rule to the health metric to determine that an alert has been generated on the logical service. An alert may then be triggered which is transmitted from the microservice 202 to the monitoring tool 206.

In an example embodiment, the microservice 202 obtains an alert associated with the logical service from the monitoring tool 206. The microservice 202 determines a health metric associated with a third logical service based on the alert associated with the logical service, where the third logical service comprises at least one logical service. In other words, the microservice 202 may determine a health metric or an alert for a third logical services based on an alert associated with the logical service, or any other logical services which are sub logical services of the logical service.

In an example embodiment, the microservice 202 maintains a mapping of the logical service and components that comprise the logical service. In an example embodiment, the components of the logical service may comprise a second logical service, sub logical services of the second logical service, one or more physical devices 203-N, and/or one or more component services 205-N. In an example embodiment, the microservice 202 determines the health metric associated with the logical service based on the mapping and alerts associated with the components. In an example embodiment, the mapping may be maintained within a rules file. The rules file may specify the other logical services, physical devices 203-N and/or component services 205-N that may make up the logical service. In an example embodiment, the microservice 202 determines a health metric associated with the logical service by applying a rule to the generated alerts. In another example embodiment, the microservice 202 may determine an alert by applying a rule to the health metric. Thus, an alert may affect a health metric associated with a logical service, and a health metric may trigger an alert.

In an example embodiment, the microservice 202 may determine a gradation of the health metric associated with the logical service based on alerts associated with the components. In an example embodiment, the rules may derive the health of the higher-level service with finer granularity. For example, if 40% of the physical devices 203-N are malfunctioning and generating alerts, the microservice 202 may determine that the higher-level service (i.e., the logical service) is still functioning, but may be operating in a degraded mode. In an example embodiment, if 20% of the physical devices 203-N are malfunctioning and generating alerts, the microservice 202 may determine that the higher-level service (i.e., the logical service) is still functioning, and operating at an acceptable level.

In an example embodiment, the microservice 202 determines the health metric associated with the logical service based on a composition of alerts associated with the components. Using the above example again, the microservice 202 may determine a health metric or trigger an alert if a certain percentage of the components associated with a logical service are generating alerts.

In an example embodiment, the microservice 202 determines the health metric associated with the logical service based on at least one of at least one alert and a health metric associated with at least one second logical service, obtained by the microservice from the monitoring tool. As noted above, the health metric associated with a logical service may be determined based on either an alert or a health metric associated with a sub logical service.

Accordingly, the particular processing operations and other functionality described in conjunction with the flow diagram of FIG. 3 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve determining the health of higher-level services. For example, some embodiments are configured to provide at least one of: provide a higher-level service health system that monitors the health status of logical or abstract services, provide a higher-level service health system that does not require adding an additional database, providing business logic to analyze the data, and application logic to trigger alerts associated with the logical services, provide a higher-level service health system that is efficiently only triggered when alerts occur, and provide a higher-level service health system that determines the higher-level service health in an efficient and scalable way using fewer resources and code complexity. These and other embodiments can effectively improve how higher-level service health is monitored relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
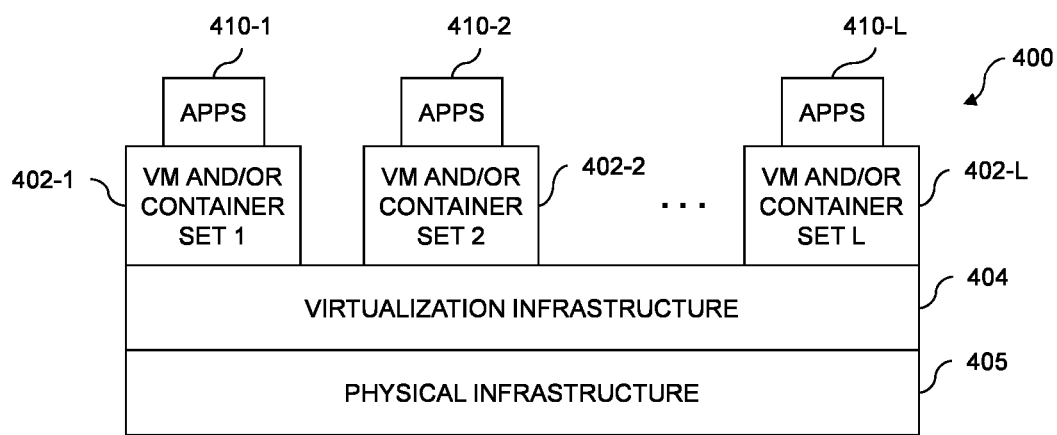
FIGS. 4 and 5 show examples of processing platforms that may be utilized to implement at least a portion of a higher-level service health embodiments.
Figure 5:
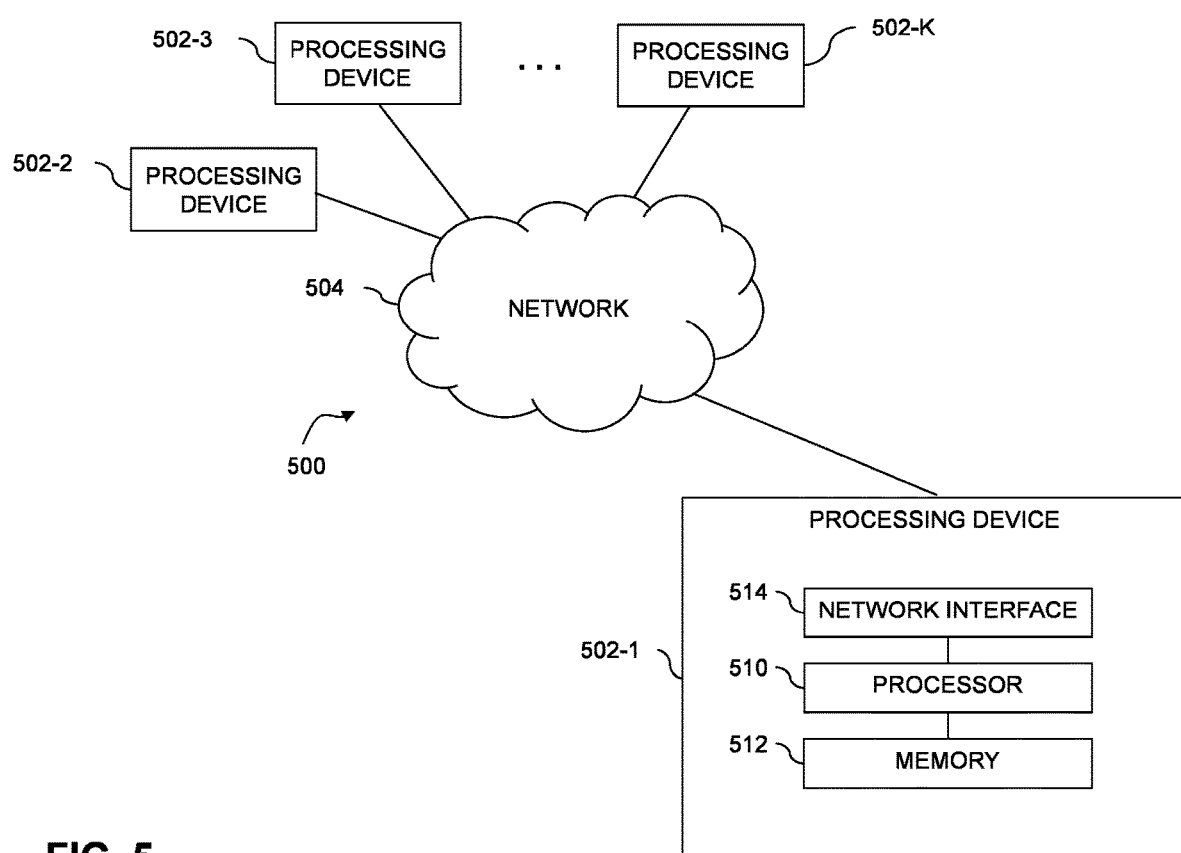

FIG. 4 shows an example processing platform comprising cloud infrastructure 400. The cloud infrastructure 400 comprises a combination of physical and virtual processing resources that are utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that comprises at least one hypervisor.

A hypervisor platform may be used to implement a hypervisor within the virtualization infrastructure 404, where the hypervisor platform has an associated virtual infrastructure management system. The underlying physical machines comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 comprises a microprocessor, a microcontroller, an application-specific integrated circuit (ASIC), a field-programmable gate array (FPGA) or other type of processing circuitry, as well as portions or combinations of such circuitry elements.

The memory 512 comprises random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    monitoring, by a monitoring tool, status metrics associated with at least one of a plurality of physical devices and a plurality of component services, wherein alerts generated from the monitoring tool are stored in a database associated with the monitoring tool, and wherein at least one of the component services executes on the at least one of the plurality of physical devices;
    identifying, by a microservice, at least one logical service, wherein the at least one logical service is comprised of at least one of the at least one of the plurality of physical devices, and the at least one of the plurality of component services, and wherein the at least one logical service is comprised of at least one second logical service;
    determining, by the microservice, a health metric associated with the at least one logical service based on the generated alerts; and
    transmitting the health metric associated with the at least one logical service from the microservice to the monitoring tool, wherein the method is implemented by at least one processing device comprising a processor coupled to a memory.

2. The method of claim 1 wherein monitoring, by the monitoring tool, status metrics comprises:
    generating, by the monitoring tool, at least one alert when at least one of a respective physical device and component service malfunctions.

3. The method of claim 1 further comprising:
    maintaining, by the microservice, a mapping of the at least one logical service and components that comprise the at least one logical service, wherein the components comprise at least one of i) a second logical service, ii) the at least one of the plurality of physical devices, and iii) the at least one of the plurality of component services.

4. The method of claim 3 wherein determining, by the microservice, the health metric associated with the at least one logical service comprises:
    determining the health metric associated with the at least one logical service based on the mapping and alerts associated with the components.

5. The method of claim 3 wherein determining, by the microservice, the health metric associated with the at least one logical service comprises:
    determining a gradation of the health metric associated with the at least one logical service based on alerts associated with the components.

6. The method of claim 3 wherein determining, by the microservice, the health metric associated with the at least one logical service comprises:
determining the health metric associated with the at least one logical service based on a composition of alerts associated with the components.

7. The method of claim 1 wherein determining, by the microservice, the health metric associated with the at least one logical service comprises:
determining, by the microservice, the health metric associated with the at least one logical service based on at least one alert provided by the monitoring tool.

8. The method of claim 1 wherein determining, by the microservice, the health metric associated with the at least one logical service comprises:
collecting, by the microservice, generated alerts from the monitoring tool that are associated with the at least one of i) the at least one of the plurality of physical devices, and ii) the at least one of the plurality of component services that comprise the at least one logical service.

9. The method of claim 1 wherein determining, by the microservice, the health metric associated with the at least one logical service comprises:
determining, by the microservice, a health metric associated with the at least one logical service by applying a rule to the generated alerts.

10. The method of claim 1 wherein determining, by the microservice, the health metric associated with the at least one logical service comprises:
determining, by the microservice, the health metric associated with the at least one logical service based on at least one of at least one alert and a health metric associated with at least one second logical service, obtained by the microservice from the monitoring tool.

11. The method of claim 1 wherein transmitting the health metric associated with the at least one logical service from the microservice to the monitoring tool comprises:
transmitting an alert associated with the at least one logical service from the microservice to the monitoring tool.

12. The method of claim 1 wherein transmitting the health metric associated with the at least one logical service from the microservice to the monitoring tool comprises:
generating a rule in the microservice that maps the health metric associated with the at least one logical service to an alert associated with the at least one logical service.

13. The method of claim 12 wherein determining, by the microservice, the health metric associated with the at least one logical service comprises:
obtaining, by the microservice, a health metric associated with the at least one logical service from the monitoring tool; and
determining, by the microservice, an alert has been generated on the at least one logical service.

14. The method of claim 1 wherein determining, by the microservice, the health metric associated with the at least one logical service comprises:
obtaining, by the microservice from the monitoring tool, an alert associated with the at least one logical service.

15. The method of claim 14 further comprising:
determining a health metric associated with a third logical service based on the alert associated with the at least one logical service, wherein the third logical service comprises the at least one logical service.

16. A system comprising:
at least one processing device comprising a processor coupled to a memory;
the at least one processing device being configured:
to monitor, by a monitoring tool, status metrics associated with at least one of a plurality of physical devices and a plurality of component services, wherein alerts generated from the monitoring tool are stored in a database associated with the monitoring tool, and wherein at least one of the component services executes on the at least one of the plurality of physical devices;
to identify, by a microservice, at least one logical service, wherein the at least one logical service is comprised of at least one of the at least one of the plurality of physical devices, and the at least one of the plurality of component services, and wherein the at least one logical service is comprised of at least one second logical service;
to determine, by the microservice, a health metric associated with the at least one logical service based on the generated alerts; and
to transmit the health metric associated with the at least one logical service from the microservice to the monitoring tool.

17. The system of claim 16 wherein the at least one processing device is further configured to:
maintain, by the microservice, a mapping of the at least one logical service and components that comprise the at least one logical service, wherein the components comprise at least one of i) a second logical service, ii) the at least one of the plurality of physical devices, and iii) the at least one of the plurality of component services.

18. A computer program product comprising a non-transitory processor-readable storage medium having stored therein program code of one or more software programs, wherein the program code when executed by at least one processing device causes said at least one processing device:
to monitor, by a monitoring tool, status metrics associated with at least one of a plurality of physical devices and a plurality of component services, wherein alerts generated from the monitoring tool are stored in a database associated with the monitoring tool, and wherein at least one of the component services executes on the at least one of the plurality of physical devices;
to identify, by a microservice, at least one logical service, wherein the at least one logical service is comprised of at least one of the at least one of the plurality of physical devices, and the at least one of the plurality of component services, and wherein the at least one logical service is comprised of at least one second logical service;
to determine, by the microservice, a health metric associated with the at least one logical service based on the generated alerts; and
to transmit the health metric associated with the at least one logical service from the microservice to the monitoring tool.

19. The computer program product of claim 18 further configured to:
maintain, by the microservice, a mapping of the at least one logical service and components that comprise the at least one logical service, wherein the components comprise at least one of i) a second logical service, ii) the at least one of the plurality of physical devices, and iii) the at least one of the plurality of component services.

* * * * *